(12) United States Patent
Jungerman et al.

(10) Patent No.: US 8,224,269 B2
(45) Date of Patent: Jul. 17, 2012

(54) VECTOR MODULATOR CALIBRATION SYSTEM

(75) Inventors: Roger L. Jungerman, Petaluma, CA (US); Geoffrey Hopcraft, Santa Rosa, CA (US); Zoltan Azary, Occidental, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 857 days.

(21) Appl. No.: 11/581,876

(22) Filed: Oct. 16, 2006

(65) Prior Publication Data

US 2008/0090531 A1 Apr. 17, 2008

(51) Int. Cl.
*H01Q 11/12* (2006.01)
(52) U.S. Cl. ......... 455/126; 455/130; 455/214; 455/522
(58) Field of Classification Search ........................ None
See application file for complete search history.

(56) References Cited

U.S. PATENT DOCUMENTS

| 3,500,193 | A | * | 3/1970 | Kemanis | 324/76.19 |
| 5,119,399 | A | * | 6/1992 | Santos et al. | 375/224 |
| 5,684,480 | A | * | 11/1997 | Jansson | 341/139 |
| 2004/0095995 | A1 | * | 5/2004 | Matreci et al. | 375/224 |
| 2005/0075815 | A1 | * | 4/2005 | Webster et al. | 702/106 |

OTHER PUBLICATIONS

Operating and Evaluating Quadrature Modulators for Personal Communication Systems National Semiconductor Application Note 899 Ruth Umstattd Oct. 1993.*

* cited by examiner

*Primary Examiner* — Lana N Le
*Assistant Examiner* — Hsin-Chun Liao

(57) ABSTRACT

A vector modulator calibration system ("VMCS") for obtaining a calibrated modulated output signal while minimizing spurious output signals from a vector modulator is shown. The VMCS may include a power sensor in signal communication with the vector modulator and a digitizer in signal communication with the power sensor.

19 Claims, 10 Drawing Sheets

VECTOR MODULATOR CALIBRATION SYSTEM

BACKGROUND OF THE INVENTION

Modern Radio Frequency ("RF") and microwave communication systems typically utilize digital communication techniques to communicate information. These digital communication techniques include, among others, up-conversion (i.e., a frequency translation method in which the output frequency of an output signal produced by an up-converting device has a higher frequency than the input frequency of an input signal to the up-converting device) and modulation (i.e., a process of varying some characteristics of a carrier wave signal as the information to be transmitted on the carrier wave signal varies). Up-conversion generally includes direct conversion (i.e., the process of frequency translation in a single step) and intermediate frequency ("IF") up-conversion (i.e., the process of frequency translation with more than a single frequency translation step). Modulation generally includes complex modulation that is also referred to as, for example, "vector modulation," "quadrature modulation," "IQ modulation," "I/Q modulation," and "I-Q modulation," where the "in-phase" component of the signal is denoted by I and the "quadrature-phase" component is denoted by Q. Complex modulation generally refers to the independent modulation of the in-phase and quadrature-phase components of a carrier wave signal.

In many situations it is desirable to have RF and/or microwave devices that operate with a wide modulation bandwidth and a calibrated modulation response and are capable of creating complex modulated waveforms on a RF or microwave carrier signal. Generally, vector modulation techniques have wider modulation bandwidth than IF up-conversion techniques, where the modulation bandwidth is generally defined as the maximum rate of change in the output frequency that may be attained utilizing the control voltage of a voltage-controlled frequency source such as, for example, a voltage-controlled oscillator ("VCO"), and the modulation response is generally defined as the frequency dependence of the amplitude modulation imposed on an injected carrier wave signal when the bias current to the voltage controlled frequency source is modulated.

Unfortunately, vector modulators typically suffer from dynamic range impairments (sometime known as "quadrature impairments") due to various spurious signals. These include gain imbalance, phase imbalance, local oscillator ("LO") feed-through, and images versus modulation frequency. In addition, the modulation frequency response of the baseband generator as well as the up converter will contribute to complex frequency response variations (amplitude and phase) across the modulation spectrum.

LO feed-through occurs when power at the frequency of the LO used to generate the two sinusoids of the vector modulation process is undesirably present in the output of the quadrature modulator. The power present at the LO frequency disadvantageously wastes valuable output power. Similarly, undesired coupling of the LO into a quadrature demodulator results in an undesirable DC offset in the recovered baseband signals.

Gain imbalance occurs where the two sinusoids have unequal power, when the two baseband signals (input signals to the quadrature modulator, or output signals from the quadrature demodulator) are amplified/attenuated by different amounts by the quadrature modulation or demodulation device or by supporting hardware, e.g., filters and the like. Phase imbalance occurs in situations such as where the two sinusoids used in the quadrature modulation/demodulation process exhibit a phase relationship that deviates from 90-degrees, where there are differences in the group delay between the I and Q circuit paths, and the like.

Attempts at solving these problems have included utilizing direct current ("DC") calibration methods, scalar spectrum analyzers and power leveling techniques. Unfortunately, these attempted solutions have various shortcomings.

As an example, DC calibration methods have been utilized where DC bias voltages have been applied to a vector modulator and then the resulting up-converted output power was measured as the DC bias voltages were varied. Unfortunately, these types of methods only function at DC. As a consequence there are limitations in the signal to noise ratio ("SNR" or "S/N") of these types of calibrations because they do not allow the utilization of sophisticated digital signal processing techniques such as, for example, a Fast Fourier Transform ("FFT"). Moreover, these types of methods are fairly slow, do not completely eliminate the spurs, and do not calibrate as a function of the baseband frequency.

As another example, attempts at solving these problems have included utilizing calibration methods that utilize a scalar spectrum analyzer to measure a set of sine wave tones applied the vector modulator. By measuring the scalar frequency response, it is possible to calculate the amplitude response of the up-conversion. Using the amplitude response and certain assumptions, the phase response may also be calculated. However, these types of methods create errors because the characteristics, such as the total delay or delay skew between paired digital-to-analog converter ("DAC") channels, cannot be determined from a scalar measurement. Unfortunately, these methods require a separate spectrum analyzer, create errors, and are fairly slow.

As a result, there is a need for devices that operate with a wide modulation bandwidth and a calibrated modulation response and are capable of creating complex modulated waveforms on a RF or microwave carrier signal.

BRIEF SUMMARY OF THE INVENTION

A vector modulator calibration system ("VMCS") for obtaining a calibrated modulated output signal while minimizing spurious output signals from a vector modulator is substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
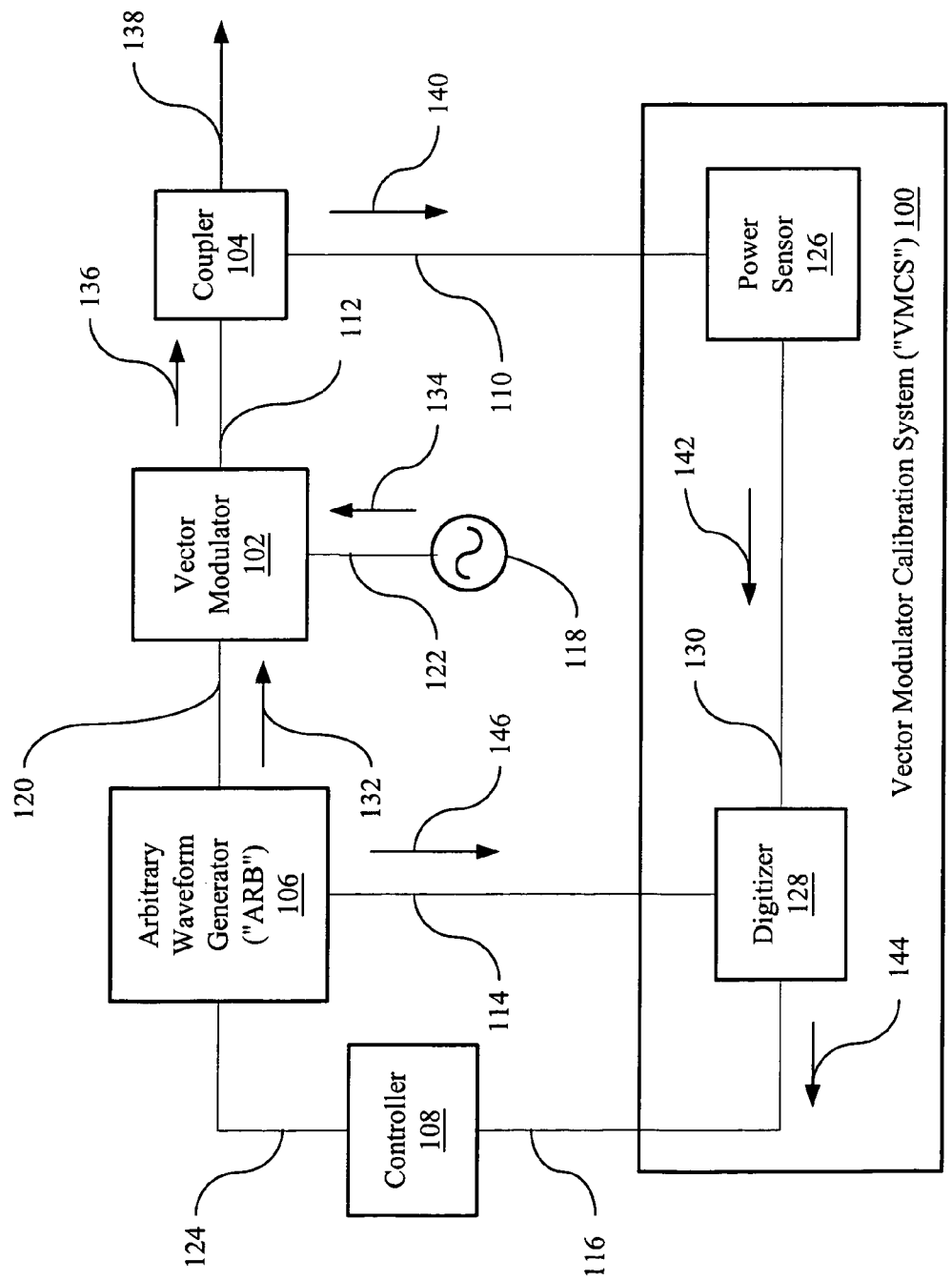
FIG. 1 shows a block diagram of an example of an implementation of a Vector Modulator Calibration System ("VMCS").

In the following description of the preferred and various alternative embodiments, reference is made to the accompanying drawings that form a part hereof, and in which is shown by way of illustration a specific embodiment in which the invention may be practiced. It is to be understood that other embodiments may be utilized and structural changes may be made without departing from the spirit and scope of this invention.

The invention is described with reference to various functional block diagrams, which illustrate possible applications and embodiments of the invention from a functional perspective. These functional block diagrams should not be interpreted to imply or otherwise require a particular physical architecture in accordance with the partitioning of the functionality depicted therein. Instead, it will be appreciated by one of ordinary skill in the art that various alternative physical architectures (whether hardware, software or a combination thereof) may be utilized to implement the described functionality. For example, the invention may be implemented utilizing various hardware and software components, including, for example, utilizing a semiconductor integrated circuit (e.g., a chip) or a combination of semiconductor integrated circuits (e.g., a chipset or multi-chip module), or in associated circuitry, or in the software, firmware, protocol stacks, libraries, algorithms or other processes operating thereon (or in any configuration of one or more of the foregoing). The chip or chipset implementation may include an integrated circuit, including, for example, any of the following alone or in combination: an application specific integrated circuit ("ASIC"), a digital signal processor ("DSP"), or another general-purpose or specific-purpose processor, and associated circuitry (e.g., memory, co-processors, busses, etc.).

A vector modulator calibration system ("VMCS") for obtaining a calibrated modulated output signal while minimizing spurious output signals from a vector modulator is shown. Generally, the VMCS may include a power sensor and a digitizer. The power sensor may be in signal communication with the vector modulator and the digitizer may be in signal communication with the power sensor. In general, the power sensor is configured to receive a sampled signal from the vector modulator and in response produce a power level signal of the sampled signal, and the digitizer is configured to receive the power level signal and in response produce a digitized power level signal.

In an example of operation, the VMCS samples a received output signal from the vector modulator to produce a sampled signal. The VMCS then measures the power level of the sampled signal and digitizes the power level. In general, the use of a power sensor with a moderate bandwidth digitizer together with modifications to the baseband waveform, allow a rapid and accurate calibration of DC spurious performance as well as calibration of the modulation frequency response to be performed. A subset of the method can also be used for the calibration of standard IF mixer-based up-conversion, as well as baseband generators such as digital-to-analog converters ("DACs").

FIG. 1 shows a block diagram of an example of an implementation of the VMCS 100. The VMCS 100 may be in signal communication with a vector modulator 102 via a coupler 104, arbitrary waveform generator ("ARB") 106, and controller 108 via signal paths 110, 112, 120, 114, and 116, respectively. The vector modulator 102 may be in signal communication with the coupler 104, the ARB 106, and a frequency source 118 via signal paths 112, 120, and 122, respectively. The controller 108 may also be in signal communication with the ARB 106 via signal path 124. The VMCS 100 may include a power sensor 126 and digitizer 128 in signal communication via signal path 130.

The vector modulator 102 may be any type of modulator that utilizes complex modulation that generally refers to the independent modulation of the in-phase ("I") and quadrature-phase ("Q") components of a carrier wave signal. Complex modulation is also referred to as, for example, "vector modulation," "quadrature modulation," "IQ modulation," "I/Q modulation," and "I-Q modulation." The ARB 106 is a device capable of generating complex arbitrary waveforms such as, for example, a N6030A dual-channel ARB manufactured by Agilent Technologies of Santa Clara, Calif.

The coupler 104 is a device capable of transferring energy from signal path 112 to signal path 110 (where each signal path may be a conductive or dielectric medium) thereby "sampling" a portion of an input signal on signal path 112 to produce a "sampled" or "coupled" output signal on signal path 110 of the input signal. As an example, the coupler 104 may be a conductive, capacitive, inductive, or directional coupler.

The frequency source 118 includes a voltage-controlled oscillator ("VCO"), voltage-controlled crystal oscillator ("VCXO"), temperature-compensated voltage-controlled crystal oscillator ("TVCXO"), ceramic resonator oscillator ("CRO"), dielectric resonator oscillator ("DRO"), and Yttrium, Iron and Garnet ("YIG") tuned oscillator ("YTO") or other similar type devices. The frequency source 118 may also be a differential frequency source that produces the carrier signal 134 with two polarities present. The first polarity is a positive polarity signal and the second polarity is a negative polarity signal. If the frequency source 118 is not a differential frequency source, an inverter (not shown) may be included with a separate signal path (not shown) between the frequency source 118 and the vector modulator 102. The inverter will produce a negative polarity input signal that may be input into the vector modulator 102 with the positive polarity carrier signal 134.

The power sensor 126 may be any device capable of detecting power in an radio frequency ("RF") signal such as, for example, a diode detector. The digitizer 128 may be any device capable of receiving an input analog signal and converting it into an output digital signal representative of the input analog signal where the detector frequency response is traceable. As an example the power sensor 126 may be an 8474C diode detector manufactured by Agilent Technologies of Santa Clara, Calif., or similar device. In general, diode detectors are commonly utilized for power leveling in microwave output chains to set the output power and may easily be calibrated as a function of frequency. As an example, the digitizer 128 may be an analog-to-digital converter (also know as an "A/D" or "ADC") such as the NI PCI-5124 from National Instruments of Austin, Tex., which samples at 200 MS/s with 12 bits of resolution.

In this example, it is assumed that the ARB 106 is feeding the I and Q ports (not shown) of the vector modulator 102 and the LO port (not shown) is fed by the frequency source 118. The output 136 of the vector modulator 102 is fed through some type of linear network (such as the coupler 104 and an optional filter, not shown) into the power sensor 126. As shown in this example, it is possible to use the coupler 104 to feed only a small portion 140 of the output 136 to the power sensor 126; if so, it is optionally possible to amplify the detected signal 142 as necessary after detection with the power sensor 126 to allow use of the full digitizer dynamic range of digitizer 128.

As an example of operation, the ARB 106 produces a complex arbitrary waveform signal 132 that is passed to the vector modulator 102 via signal path 120. The vector modulator 102 receives the arbitrary waveform signal 132 and modulates it with a carrier signal 134 from the frequency source 118 to produce a vector modulated signal 136 that may be optionally a frequency shift keyed ("FSK") modulated signal, quadrature amplitude modulated ("QAM") signal, or other type of amplitude and/or phase modulated signal. The vector modulated signal 136 is passed to the coupler 104 via signal path 112 and the coupler 104 couples a portion of the energy of the vector modulated signal 136 to produce a coupler output signal 138 and sampled signal 140 (also referred to as a "coupled signal"). The sampled signal 140 is passed to the power sensor 126 via signal path 110 and the power sensor 126 detects the power level of the sampled signal 140 and produces a power level signal 142 that is passed to the digitizer 128 via signal path 130. The digitizer 128 receives the power level signal 142 and digitizes it to produce a digitized signal 144 that may be passed to the controller 108 via signal path 116. The controller 108 may control the operation of the ARB 106 in response to the information received on the digitized signal 144. If the digitizer 128 is an ADC, the digitizer 128 may receive a reference clock signal 146 from the ARB 106, via signal path 114, as a "digitizer trigger" to improve measurement consistency by synchronizing the digitizer 128 to the ARB 106. The reference clock signal 146 may be produced by utilizing a waveform marker on the ARB 106. In this example, the resulting coupler output signal 138 is a calibrated modulated output signal that has minimized spurious output signals.

Figure 2A:
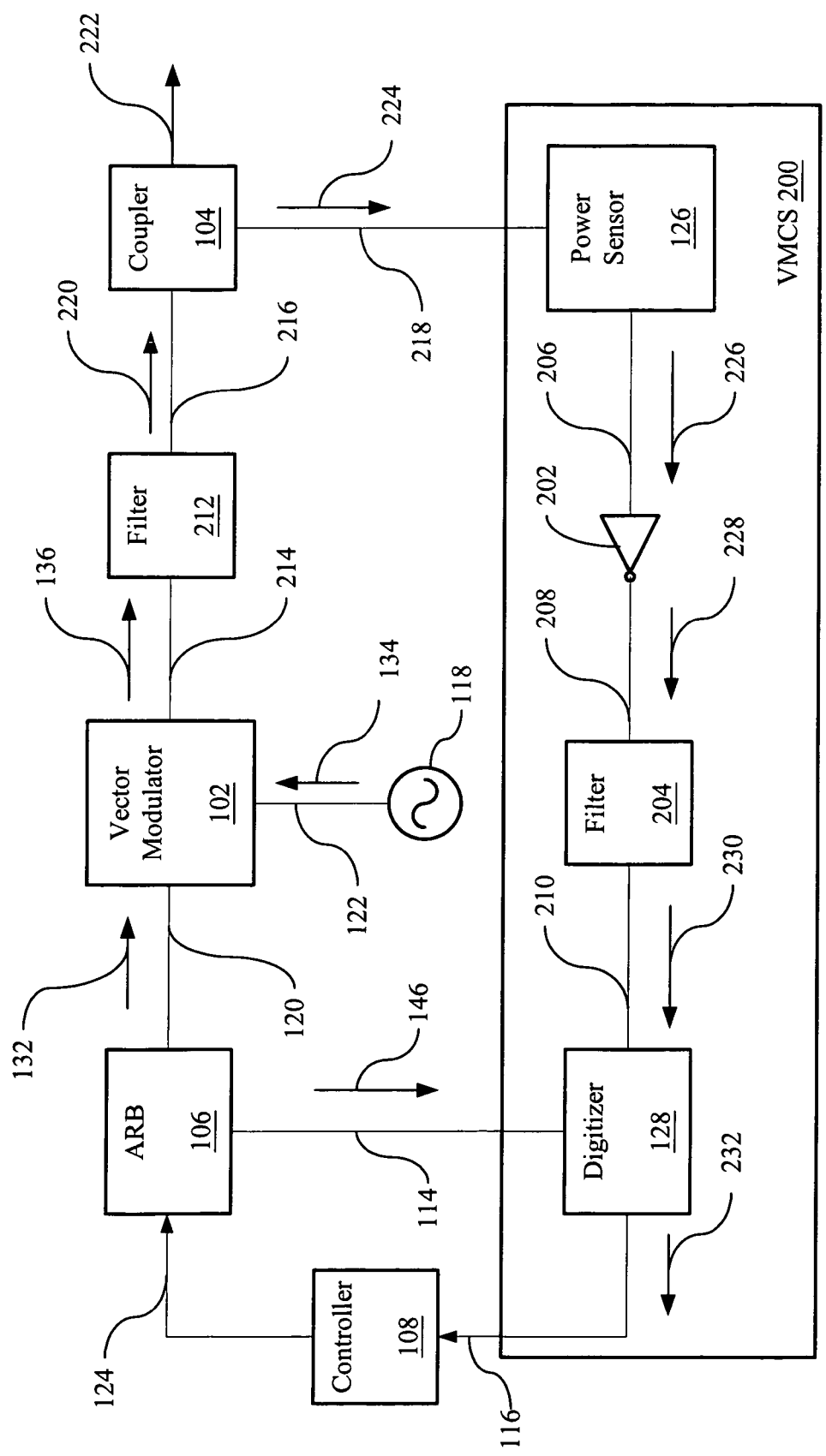
FIG. 2A shows a block diagram of an example of another implementation of the VMCS.

FIG. 2A shows a block diagram of an example of another implementation of the VMCS 200. In this example, the VMCS 200 includes the same common components, devices and/or modules as the implementation of VMCS 100 shown in FIG. 1. Specifically, the vector modulator 102, coupler 104, ARB 106, controller 108, power sensor 126, and digitizer 128 may be the same in both implementations. In FIG. 2, however, the VMCS 200 includes amplifier 202 and VMCS filter 204 between the power sensor 126 and digitizer 128. The amplifier 202 may be in signal communication with both the power sensor 126 and VMCS filter 204 via signal paths 206 and 208, respectively. The VMCS filter 204 may also be in signal communication with the digitizer 128 via signal path 210. Additionally, a modulator output filter 212 may be included in signal communication with the vector modulator 102 and the coupler 104 via signal paths 214 and 216, respectively. The coupler 104 is then in signal communication with the power sensor 126 via signal path 218.

Figure 2B:
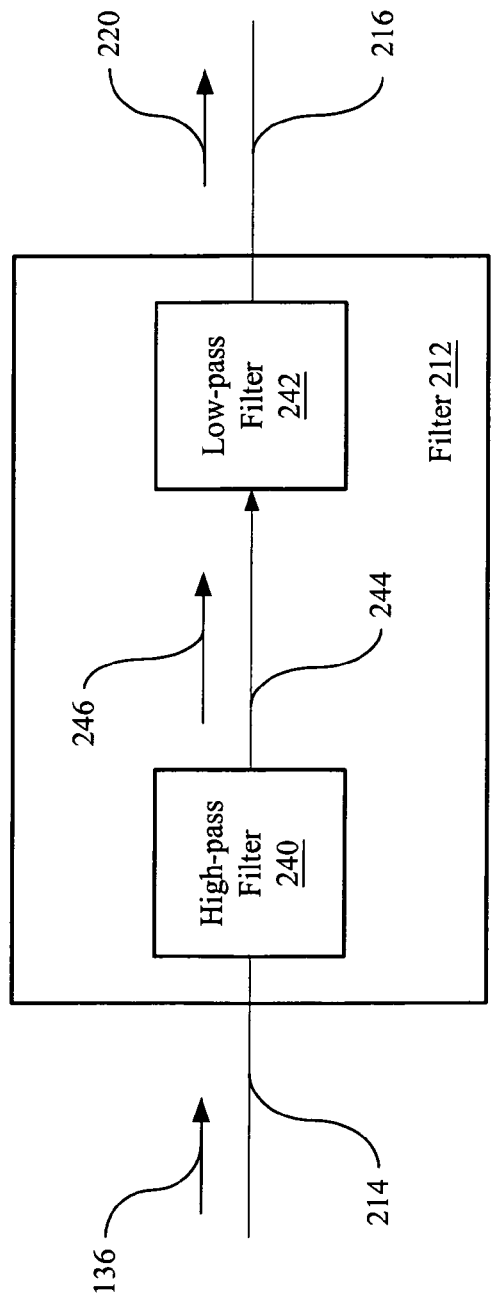
FIG. 2B shows a block diagram of an example of an implementation of a modulator output filter as shown in FIG. 2A.

As an example, the amplifier 202 may be an alternating current ("AC") coupled preamplifier with low noise such as, for example, Agilent AD604 or similar device. The VMCS filter 204 may be a low-pass filter that eliminates any aliasing on the measured output 228 from the amplifier 202. The modulator output filter 212 may include a band-pass filter (not shown) or a combination of a high-pass filter 240 and low-pass filter 242 in signal communication via signal path 244 as shown in FIG. 2B. The modulator output filter 212 is a device capable of removing the intermediate frequency ("IF") feed-through and the generally significant output signals at harmonics of the frequency source 118 (i.e., the LO feed-through) which may impact the measurement by the power sensor 126. As a result, the modulator output filter 212 may include a band-pass that only passes signals that are higher than the IF frequency and lower than the LO harmonics. Alternatively, the modulator output filter 212 may instead include a high-pass filter that passes signals above the IF frequency and a low-pass filter that passes signals below the LO harmonics. The use of separate low and high pass filters may be more desirable than utilizing a single band-pass filter because typically band-pass filters have poor rejection characteristics of the third order harmonics and, in general, the vector modulator 102 will have significant IF feed-through and produce significant output at harmonics of the LO 118.

In this example, it is again assumed that the ARB 106 that is feeding the I and Q ports (not shown) of the vector modulator 102 and the LO port (not shown) is fed by the frequency source 118. The output 136 of the vector modulator 102 is fed through some type of linear network (such as the coupler 104 and filter 212) into the power sensor 126. As shown in this example, it is again possible to use the coupler 104 to feed only a small portion 224 of the output 220 to the power sensor 126; if so, it is optionally possible to amplify the detected signal 226 as necessary after detection with the power sensor 126 to allow use of the full digitizer dynamic range of digitizer 128.

As an example of operation, the ARB 106 produces a complex arbitrary waveform signal 132 that is passed to the vector modulator 102 via signal path 120. Similar to FIG. 1, the vector modulator 102, FIG. 2, receives the arbitrary waveform signal 132 and modulates it with a carrier signal 134 from the frequency source 118 to produce a vector modulated signal 136 that may be optionally a FSK modulated signal, QAM signal, or other type of amplitude and/or phase modulated signal. The vector modulated signal 136 is passed to the modulator output filter 212 via signal path 214. The modulator output filter 212 passes signals having frequencies above the IF frequency and below the frequencies of the LO harmonics. The resulting filtered modulated signal 220 is passed to the coupler 104, via signal path 216, and the coupler 104 couples a portion of the energy of the filtered modulated signal 220 to produce a filtered coupler output signal 222 and a sampled filtered signal 224. The sampled filtered signal 224 is passed to the power sensor 126 via signal path 218 and the power sensor 126 detects the power level of the sampled filtered signal 224 and produces a power level signal 226 that is passed to the amplifier 202 via signal path 206. The amplifier 202 receives the power level signal 226 and amplifies it to produce an amplified signal 228. The amplified signal 228 is passed to the VMCS filter 204, via signal path 208. The VMCS filter 204 receives the amplified signal 228 and produces a filtered amplified signal 230. The filtered amplified signal 230 is passed to the digitizer 128 via signal path 210. The digitizer 128 receives the filtered amplified signal 230 and digitizes it to produce a digitized signal 232 that may be passed to the controller 108 via signal path 116. Similar to FIG. 1, the controller 108, FIG. 2A, may control the operation of the ARB 106 in response to the information received on the digitized signal 232. Again, if the digitizer 128 is an ADC, the digitizer 128 may receive a reference clock signal 146 from the ARB 106, via signal path 114, as a digitizer trigger to improve measurement consistency by synchronizing the digitizer 128 to the ARB 106. The reference clock signal 146 may be produced by utilizing the waveform marker on the ARB 106. Similar to FIG. 1, in this example, the resulting filtered coupler output signal 222, FIG. 2A, is a calibrated modulated output signal that has minimized spurious output signals.

Figure 3A:
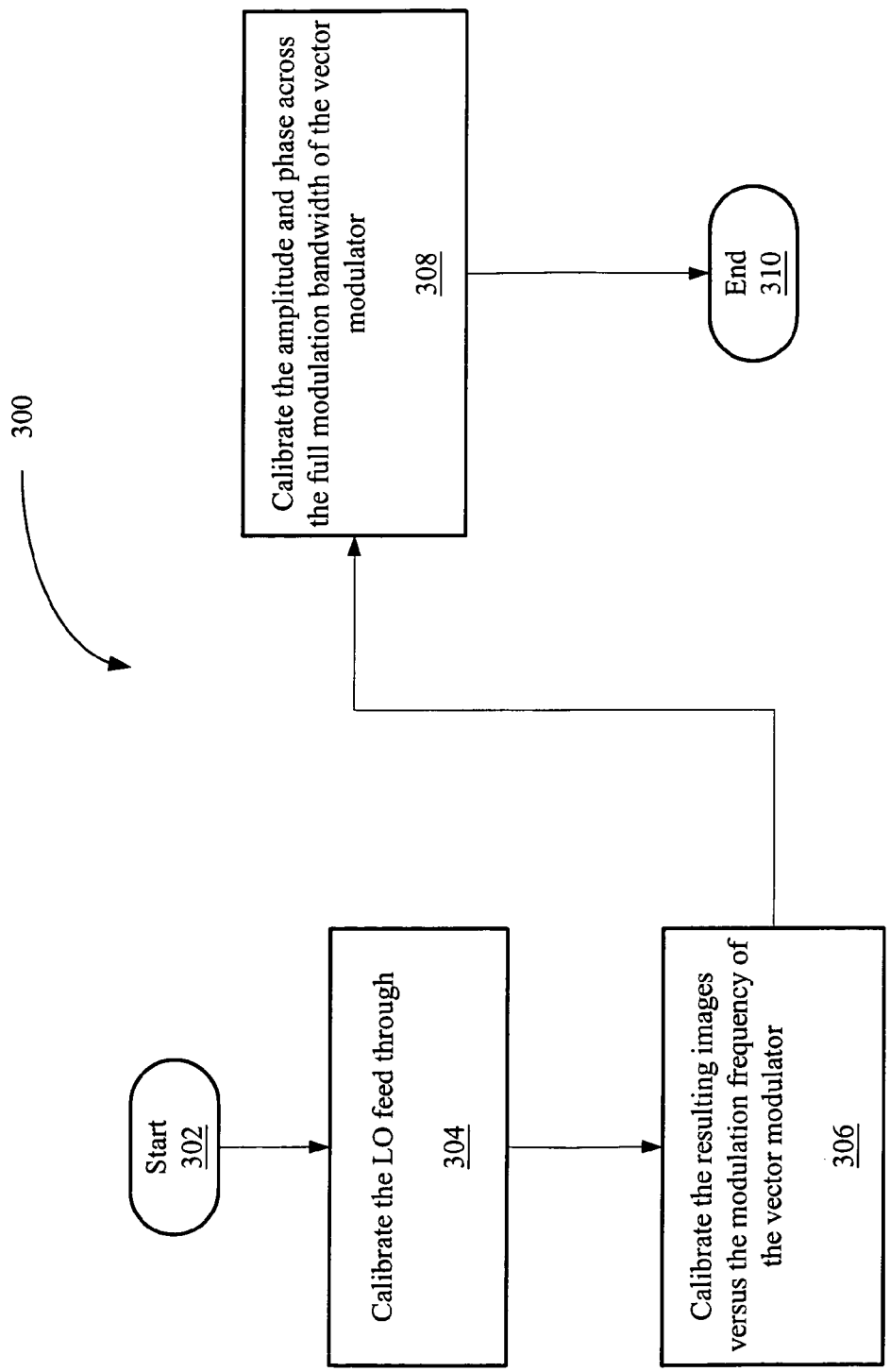
FIG. 3A shows a flowchart of the calibration process performed by the VMCS.

In general, the VMCS performs a calibration process that includes three steps as shown in the flowchart 300 of FIG. 3A. The process begins 302 and the first step 304 is to calibrate the LO feed-through and the second step 306 is to calibrate the resulting images versus the modulation frequency of the vector modulator. The third step 308 includes calibrating the amplitude and phase across the full modulation bandwidth of the vector modulator. The process then ends 310.

Theory of LO Feed-Through and DC Image Calibration

The process begins 302 and the first step 304 is to calibrate the LO feed-through and the second step 306 is to calibrate the resulting images versus the modulation frequency of the vector modulator. A paper from National Semiconductor Corporation of Santa Clara, Calif., titled "Operating and Evaluating Quadrature Modulators for Personal Communications Systems," by Ruth Umstattd on October 1993 as Application Note 899 (available on the Internet at website http://www.sss-mag.com/pdf/quad.pdf), which is herein incorporated by reference in its entirety, provides equations for evaluating the LO feed-through as a function of the I and Q DC offsets, and the images as a function of the gain imbalance and quadrature error.

The main equation of interest is described as equation (22) on page 8 as reproduced here:

$$v(t) = kV_m[K_cK_m[\sin(\omega_c t + \alpha) + D_{c1}I\sin(\omega_m t + \beta) + D_{m1}] + [\cos(\omega_c t) + D_{c2}I\cos(\omega_m t) + D_{m2}]]$$

where: $\alpha$ is the carrier phase error in radians; $K_m$ is the gain imbalance of the I and Q channels of the modulation; $D_{m1}$ is the DC offset of the I channel divided by the peak-to-peak voltage swing; and $D_{m2}$ is the DC offset of the Q channel divided by the peak-to-peak voltage swing.

Of this relationship, the desired lower sideband to a first order if the gain imbalance is assumed to be small is $$\frac{1}{2}\cos(\omega_c t + \omega_m t).$$

The LO feed-through to a first-order if the gain imbalance and quadrature errors are assumed to be small is $D_{m1}\sin(\omega_c t) + D_{m2}\cos(\omega_c t)$. Moreover, the upper sideband signal is $$\frac{1}{2}\cos(\omega_c t + \omega_m t)(1 - K_mK_c\cos(\alpha + \beta)) + \frac{1}{2}\sin(\omega_c t + \omega_m t)(K_mK_c\sin(\alpha + \beta)),$$

where the upper sideband image signal, $K_c$ is approximately equal to 1, $\beta$ is approximately equal to 0.

Utilizing these relationships as a basis, the VMCS performs a process where the LO feed-though and image calibration is performed by successive approximation. Initially, the above relationships are used to estimate the initial gain offset and quadrature values. A new measurement is performed using the calculated values and the process is repeated until the spurs at the fundamental and second harmonic (from the power sensor output) are sufficiently low.

Figure 3B:
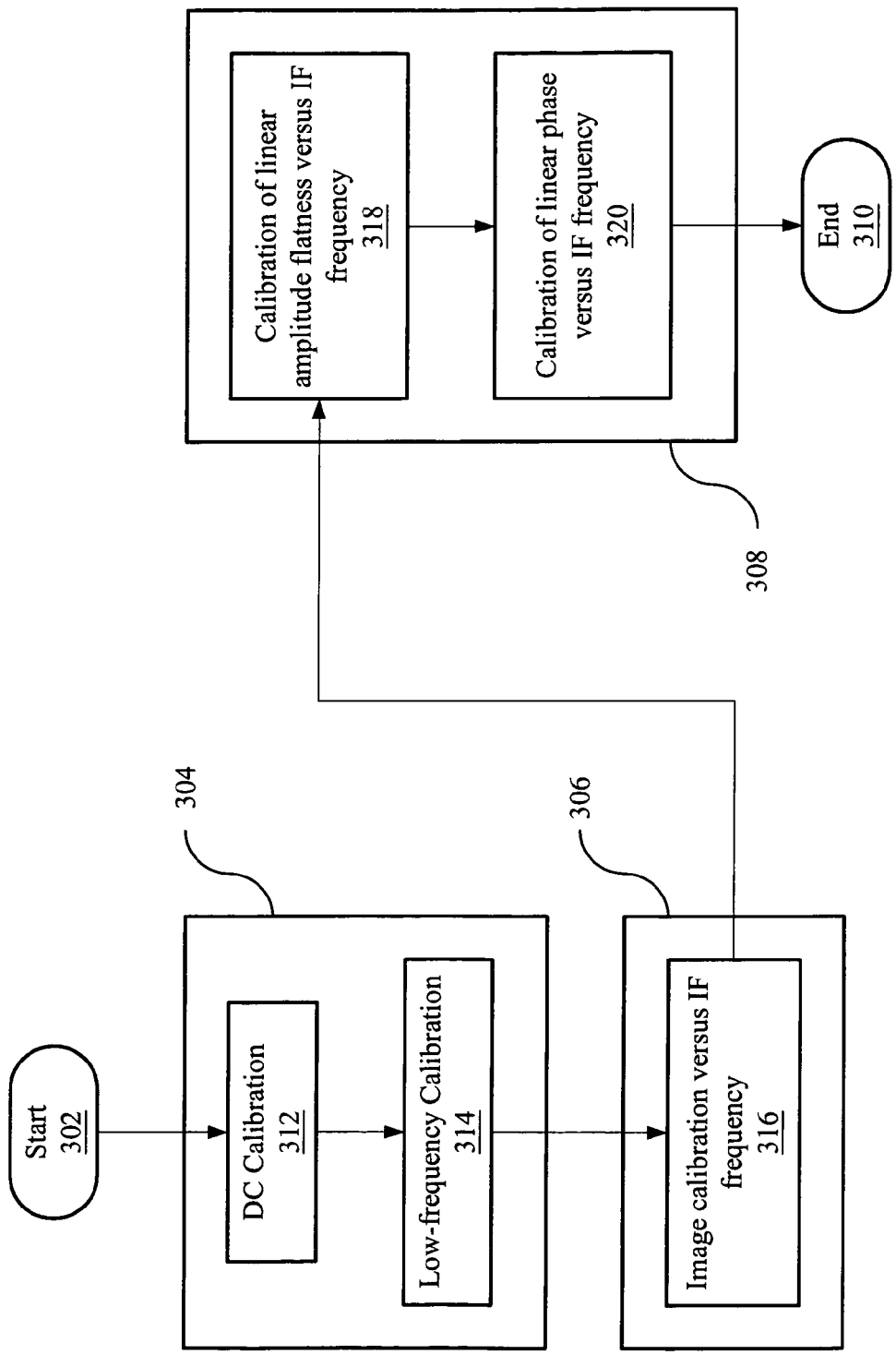
FIG. 3B shows a flowchart of sub-steps of the calibration process shown in FIG. 3A.

In this example, the three step calibration process performed by the VMCS in FIG. 3A may be expanded into five sub-steps as shown in FIG. 3B. As an example, step 304 to calibrate the LO feed through may include sub-steps 312 and 314. In step 312, a DC calibration is performed to set the I and Q channel gain ratio, quadrature phase shifter (not shown) in the vector modulator, and DC offset in the I and Q channels. In step 314, a low-frequency calibration is performed to set the gain ratio and quadrature phase shift versus frequency within ½ of the detection bandwidth.

Similarly, step 306 to calibrate the resulting images versus the modulation frequency of the vector modulator may include sub-step 316 to perform an image calibration versus IF frequency to set the relative complex gain at each offset frequency for two channels (i.e., the complex gain balance for image spur reduction). Moreover, step 308 to calibrate the amplitude and phase across the full modulation bandwidth of the vector modulator may include sub-steps 318 and 320. In step 318, a calibration of the linear amplitude flatness versus IF frequency is performed and in step 320 a calibration of the linear phase versus IF frequency is performed. These calibration steps may be performed as necessary for different LO frequencies, temperature ranges, system configurations, or other variables of interest.

LO Feed-Through and DC Image Calibration

Turning back to FIG. 2A, the test set-up of VMCS 200 for all of the I/Q calibrations may utilize the power sensor 126, such as a diode detector, chosen for its good square-law performance such as the 8474C, manufactured by Agilent Technologies of Santa Clara, Calif., and an ADC operating at or above 200 MS/s where the power sensor 126 has a frequency response that is traceable. An optional AC-coupled preamplifier 202 with low noise figure precedes the digitizer 128. To improve the consistency of vector measurements of the power sensor 126 output signal 226 with the digitizer 128, the digitizer 128 may be synchronized with the ARB 106 with either an external sample clock (not shown) or the reference clock 146 from the waveform marker on the ARB 106 such as, for example, a 10 MHz reference. When new waveforms are downloaded into the ARB 106, the phase of the ARB 106 output 132 may be corrected, if necessary, by setting the ARB 106 trigger period to a multiple of the digitizer clock frequency cycle. All these components are relatively low-cost and may be optionally integrated into a single module.

The minimum resolvable detection frequency ("$\Delta$") depends on the digitizer 128 clock frequency and a chosen (i.e., predetermined) Fast Fourier Transform ("FFT") length. If the ARB 106 waveform period is an even multiple of $\Delta$, there will not be any leakage into adjacent frequency bands after the FFT is performed. As an example for this measurement, the minimum resolvable detection frequency may be defined as $$\Delta = 16\frac{F_{Digitizer}}{L_{FFT}},$$

where $F_{Digitizer}$ represents the digitizer frequency and $L_{FFT}$ represents the FFT length. Similarly, smaller values of $\Delta$ may also be utilized. In general, if the system under test has strong variations in response versus frequency, a longer FFT or lower digitizer frequency may be utilized in order to reduce the minimum resolvable frequency.

Figure 4:
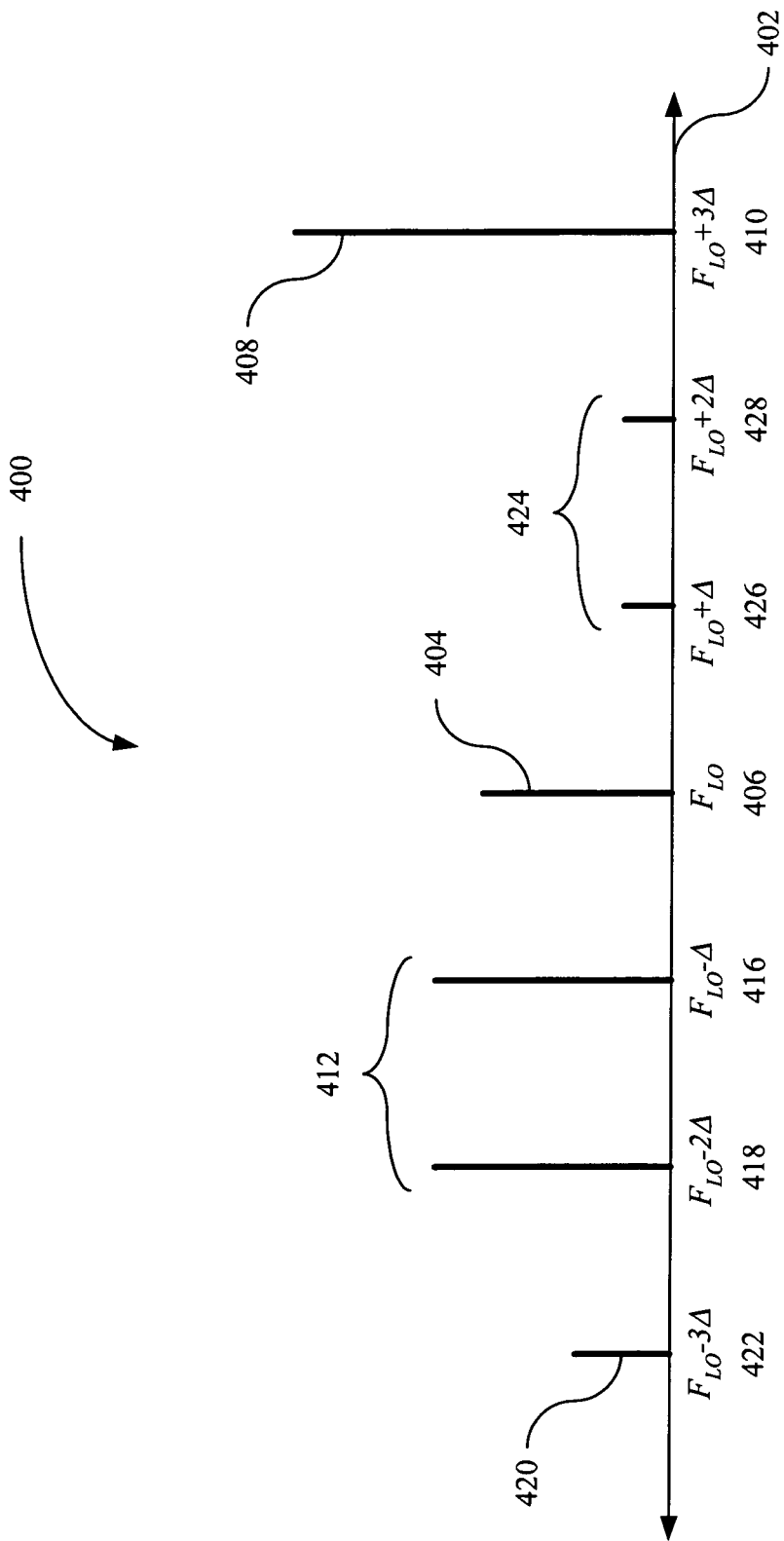
FIG. 4 shows a plot of an example DC calibration spectrum before detection versus frequency.

As an example of implementation, the ARB 106 may be programmed to produce a single sideband ("SSB") modulation. If the ARB 106 is an N6030A, manufactured by Agilent Technologies of Santa Clara, Calif. (using the internal 1.25 GHz clock), the ARB 106 may be programmed to produce a multi-tone I/Q signal using the following 3 tones: a desired upper sideband signal at a frequency equal to the frequency of the LO plus 3Δ (i.e., $F_{LO}+3\Delta$) and two test tones at frequencies $F_{LO}-\Delta$ and $F_{LO}-2\Delta$ as shown in FIG. 4. The waveform length of the tones may be set to the least common multiple of the periods of all played waveforms to help produce a smooth output. As an example, the modulation frequency of the ARB 106 may be set to about 1.22 MHz with approximately 8,192 points per cycle to lie on a frequency bin of the FFT of the digitizer 126 clock 146.

In FIG. 4, a plot 400 of an example DC calibration spectrum before detection versus frequency 402 is shown. The plot 400 shows seven signals including a LO feed-through signal 404 at a frequency $F_{LO}$ 406, desired upper sideband signal 408 at a frequency $F_{LO}+3\Delta$ 410, test tones signals 412 at frequencies $F_{LO}-\Delta$ 416 and $F_{LO}-2\Delta$ 418, image signal 420 at frequency $F_{LO}-3\Delta$ 422, and test tone images 424 at frequencies $F_{LO}+\Delta$ 426 and $F_{LO}+2\Delta$ 428.

In this example, any offsets of the ARB 106 are set to zero (or, optionally, a factory calibrated value, if known) initially and the output 232 of the digitizer 126 is measured over approximately 8,192 points. Using a complex FFT of the detected signal 232 allows the controller 108 to sense detected tones at 3Δ, 4Δ, 5Δ, and 6Δ frequency offsets where each tone in the detector output corresponds to the mixing product of different tone pairs generated by the vector modulator 102. As an example, the 3Δ tone is dominated by the mixing product of the LO+3Δ tone and the LO feed-through, the 4Δ tone is dominated by the mixing product of the LO+3Δ and the LO−Δ tones, the 5Δ tone is dominated by the mixing product of the LO+3Δ and the LO−2Δ tones, and the 6Δ tone is dominated by the mixing product of the LO+3Δ and the LO−3Δ image.

The 4Δ and 5Δ tones may be utilized to calibrate amplitude and phase uncertainty in the measurement system to produce a corrected measurement of the LO feed-through mixing product and the image mixing product.

Utilizing the Test Tones for DC Calibration

The test tones are used to reduce the effect of system phase errors, uncorrected losses, and marker/trigger clock uncertainty. In most steps of the calibration, there are two test tones in the RF domain; these mix with a primary signal to create two detectable test tones. For example, in the DC calibration, the primary signal 408 at $F_{LO}+3\Delta$ 410 mixes in the digitizer 128 with the test tone 412 at frequency $F_{LO}-\Delta$ 416 to create a 4Δ signal (not shown) that is capable of being digitized by the digitizer 128. Typically in the sample setup, test tones from the digitizer 128 have approximately 20 dB lower power than the primary signal.

Either test tone 412 (at frequencies 416 or 418) may be used as the amplitude reference. In this example, the amplitudes of all the detected signals are normalized by dividing the amplitude of all the detected signals by the amplitude of the test tone. The amplitude of all the detected signals are also normalized by multiplying each detected tone by the power ratio between the main signal and the test tone because the test tone power is typically less than the main tone power.

In this example, the two test tones 412 together form a phase reference. As the test tones 412 are close to the signal of interest, phase errors proportional to the RF frequency can be treated as constant phase errors at the detected frequency. Phase errors proportional to the detected frequency (such as post-detector cabling) are also corrected.

As an example of the process, if the VMCS has detected test tones $T_1$ and $T_2$ at detected frequencies $F_1$ and $F_2$, and a signal of interest $S_3$ at detected frequency $F_3$, the VMCS may utilize a phase correction which is linear with detected frequency such as: A=Phase $(T_1)$; B=(Phase $(T_2)$−A) $(F_2-F_1)$; and the corrected phase of $S_3$ is produced by multiplying $S_3$ by $e^{j(-A-B(F_3-F_1))}$. This same correction may be applied to all detected signals of interest.

DC Calibration: DC Offset, Gain Ratio, and Quadrature Adjustment

By measuring LO feed-through and image signals relative to the test tones, calculation of the DC offsets (causing LO feed-through) and DC quadrature phase error and gain errors (causing images) in the vector modulator may be performed. As an example, this process includes:

1) Playing a multi-tone signal from the ARB 106 I/Q ports with the following characteristics:

| Frequency of Tone | Power level of Tone |
| --- | --- |
| 3Δ | $P_{High}$ |
| −Δ | $P_{Low}$ |
| −2Δ | $P_{Low}$ |

2) Measuring the detected signal 232 from the digitizer 128 at frequencies of 3Δ, 4Δ, 5Δ, and 6Δ utilizing the triggered digitizer 128 and an FFT. In this example, the signals at 4Δ and 5Δ are the test tones $T_1$ and $T_2$. Corrections to the test tones may be applied as described above utilizing the relationships A=Phase $(T_1)$, B=(Phase $(T_2)$−Δ) $(F_2-F_1)$, and $e^{j(-A-B(F_3-F_1))}$;

3) Determining the measured quadrature and gain ratio by utilizing the following relationships:

$$\text{Phase\_quadrature}_{Measured} = -2(\text{imaginary part of the detected signal at frequency } 6\Delta);$$

and $$\text{Gain\_ratio}_{Measured} = \frac{(1 - 2[\text{real part of detected signal at frequency } 6\Delta])}{\cos(\text{Phase\_quadrature}_{Measured})};$$

4) Determining the measured DC offset by utilizing the following relationships:

$$I\_\text{offset}_{Measured} = \text{real part of detected signal at frequency } 3\Delta; \text{ and}$$

$$Q\_\text{offset}_{Measured} = \frac{\frac{\text{imaginary part of detected signal at } 3\Delta}{\text{Gain\_ratio}_{Measured}} - I\_\text{offset}_{Measured}}{\sin(\text{Phase\_quadrature}_{Measured})}$$

5) Utilizing the measured calibration coefficients to correct the waveform. This step is repeated utilizing the best known corrections, and updating the corrections at each step with the newly measured coefficients. As an example, using the DC calibration process allows the calibration to be improved from an initial poor calibration with about 20 dBc images to about 80+ dBc in approximately five (5)

iterations. If the VMCS has an optional target calibration accuracy, the VMCS may utilize the amplitude of the measured signal at 3Δ and 6Δ as a measure of the calibration accuracy, and stop the iterative process when the signals are sufficiently low as defined by the calibration accuracy.

Low-Frequency Image Calibration

A low-frequency calibration method may be utilized whenever the mixing product of the desired signal and its image are within the video bandwidth of the power sensor 126 and bandwidth of the digitizer 128. As a result, low-frequency calibration may be utilized up to an IF frequency of nearly half the power sensor 126 usable bandwidth. A method for low-frequency image calibration offers a direct measurement of image performance, which then forms the basis for a frequency-stepped calibration. The method is similar to the DC calibration process described above, although this process is no longer correcting for LO feed-through.

Figure 5:
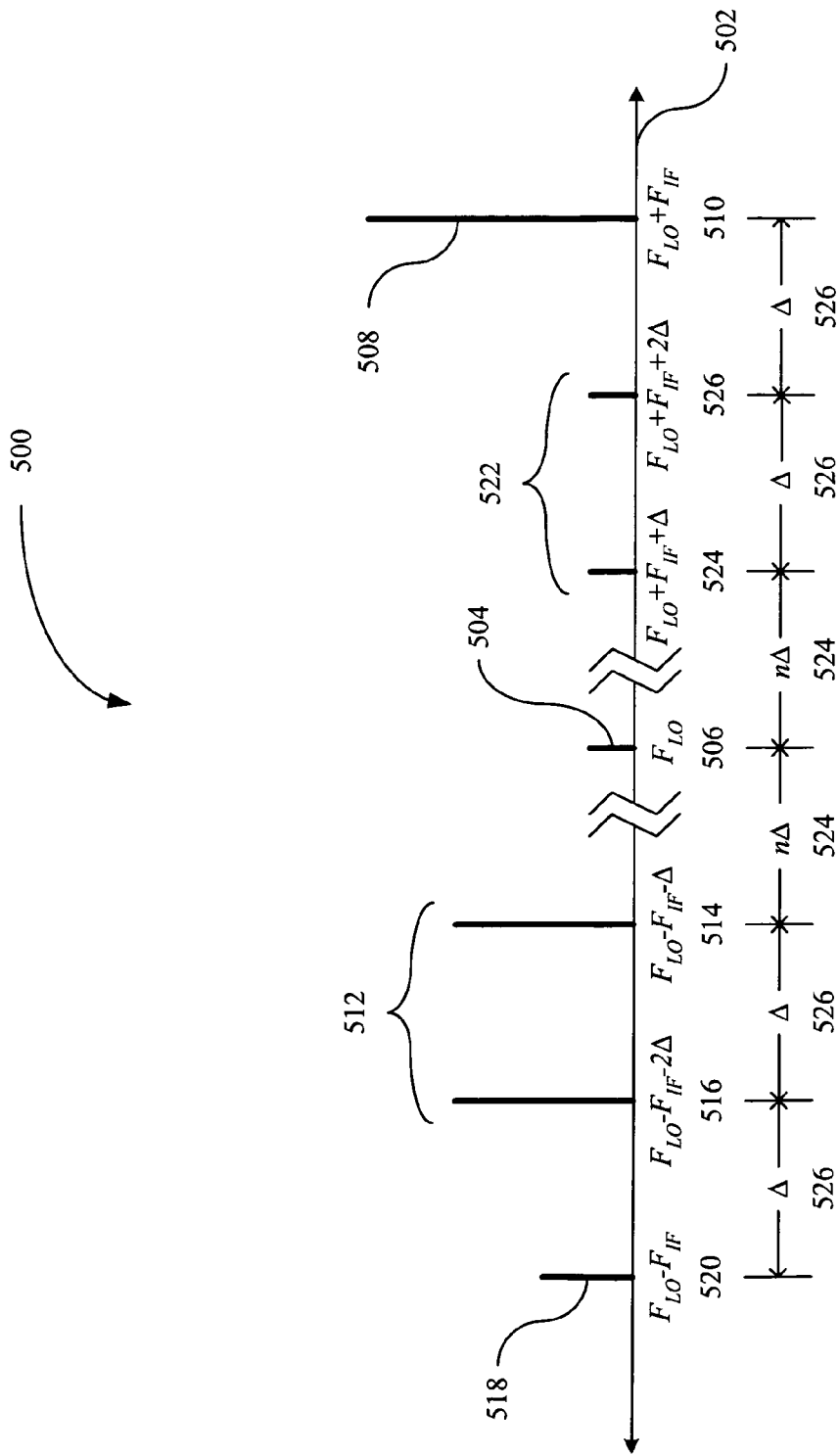
FIG. 5 shows a plot of an example low-frequency calibration spectrum before detection versus frequency.

In a low-frequency calibration method, the IF frequency ("$F_{IF}$") may be approximately a multiple of Δ so that the data from the calibration falls into a single FFT bin as shown in FIG. 5. In FIG. 5, a plot 500 of an example low-frequency calibration spectrum before detection versus frequency 502 is shown. The plot 500 shows seven signals including a LO feed-through signal 504 at a frequency $F_{LO}$ 506, desired upper sideband signal 508 at a frequency $F_{LO}+F_{IF}$ 510, test tones signals 512 at frequencies $F_{LO}-F_{IF}-\Delta$ 514 and $F_{LO}-F_{IF}-2\Delta$ 516, image signal 518 at frequency $F_{LO}-F_{IF}$ 520, and test tone images 522 at frequencies $F_{LO}+F_{IF}+\Delta$ 524 and $F_{LO}+F_{IF}+2\Delta$ 526. In this example, $F_{IF}$ is shown to be a multiple ("n") of Δ 528 and the frequency spacing 530 between signals is equal to Δ.

With proper correction by applying the calibration coefficients, the LO feed-through calibration is not significantly dependent upon IF frequency, so that it is not necessary to re-correct for the LO feed-through. In general, however, USB correction coefficients will be different from LSB correction coefficients, so it may be necessary to perform a low-frequency calibration separately for USB and LSB signals. In either case, the test tones may preferably be positioned close to the image signal.

Applying the Calibration Coefficients

At various stages in the calibration process, the calibration results need to be applied to generate a corrected waveform. The method described is capable of generating a gain ratio and phase quadrature of the Q channel relative to the I channel versus frequency. Moreover, the method also is capable of generating a linear gain and phase error versus frequency. Having a desired waveform, the VMCS is capable of correcting it utilizing a variety of techniques such as, for example, Fourier transform, FIR filter, etc. As an example, the method of applying the calibration coefficients may include the following steps:
1) Apply a Fourier transform of the desired waveform;
2) At each frequency, multiply the imaginary part of the desired signal by the quadrature error and gain ratio, producing a complex signal for the Q channel;
3) Subtract the imaginary part of the Q channel from the I channel;
4) Multiply the resultant signal (I+jQ) by the linear amplitude and phase correction;
5) Apply an inverse Fourier transform to the resultant signal; and
6) Take the real part from Step 5, add the I-channel offset, and play that on the ARB I channel. Take the imaginary part from Step 5, add the Q-channel offset, and play that on the ARB Q channel.

Low-Frequency Calibration: Gain Ratio and Quadrature Adjustment

By measuring the image signal relative to the test tones, the VMCS is capable of calculating quadrature phase error and gain errors (causing the images) in the vector modulator. As an example, this process includes:
1) Playing a multi-tone signal from the ARB 106 IQ ports with the following characteristics:

| Frequency of Tone | Power level of Tone |
|---|---|
| $F_{IF}$ | $P_{High}$ |
| $-F_{IF}+\Delta$ | $P_{Low}$ |
| $-F_{IF}+2\Delta$ | $P_{Low}$ |

2) Utilizing the triggered digitizer 128 and an FFT, measure the detected signal 232 from the digitizer 128 at frequencies of $2F_{IF}$, $2F_{IF}-\Delta$, and $2F_{IF}-2\Delta$. In this example, the signals at $2F_{IF}-\Delta$ and $2F_{IF}-2\Delta$ are the test tones $T_1$ and $T_2$ and the signal at $2F_{IF}$ is the signal of interest $S_3$. Corrections to the test tones may be applied as described above utilizing the relationships A=Phase $(T_1)$, B=(Phase $(T_2)$ − A) $(F_2-F_1)$, and $e^{j(-A-B(F_3-F_1))}$.
3) Determining the measured quadrature and gain ratio by utilizing the following relationships:

$$\text{Phase\_quadrature}_{Measured} = -2(\text{imaginary part of the detected signal at frequency } 2F_{IF});$$

and $$\text{Gain\_ratio}_{Measured} = \frac{(1 - 2[\text{real part of detected signal at frequency } 2F_{IF}])}{\cos(\text{Phase\_quadrature}_{Measured})};$$

4) Determining the measured DC offset by utilizing the following relationships:

$$I\_\text{offset}_{Measured} = \text{real part of detected signal at frequency } 3\Delta;$$ and $$Q\_\text{offset}_{Measured} = \frac{\text{imaginary part of detected signal at } 3\Delta}{\text{Gain\_ratio}_{Measured} - I\_\text{offset}_{Measured}} \sin(\text{Phase\_quadrature}_{Measured})$$

5) Utilizing the measured calibration coefficients to correct the waveform. This step is repeated utilizing the best known corrections, and updating the corrections at each step with the newly measured coefficients. As an example, using the DC calibration results as a starting point would typically result in 50 dBc images, after which it typically takes approximately three (3) iterations to reach 80+ dBc. If the VMCS has an optional target calibration accuracy, the VMCS may utilize the amplitude of the measured signal at $2F_{IF}$ as a measure of the calibration accuracy, and stop the iterative process when the signals are sufficiently low as defined by the calibration accuracy.

Stepped Image Calibration

Figure 6:
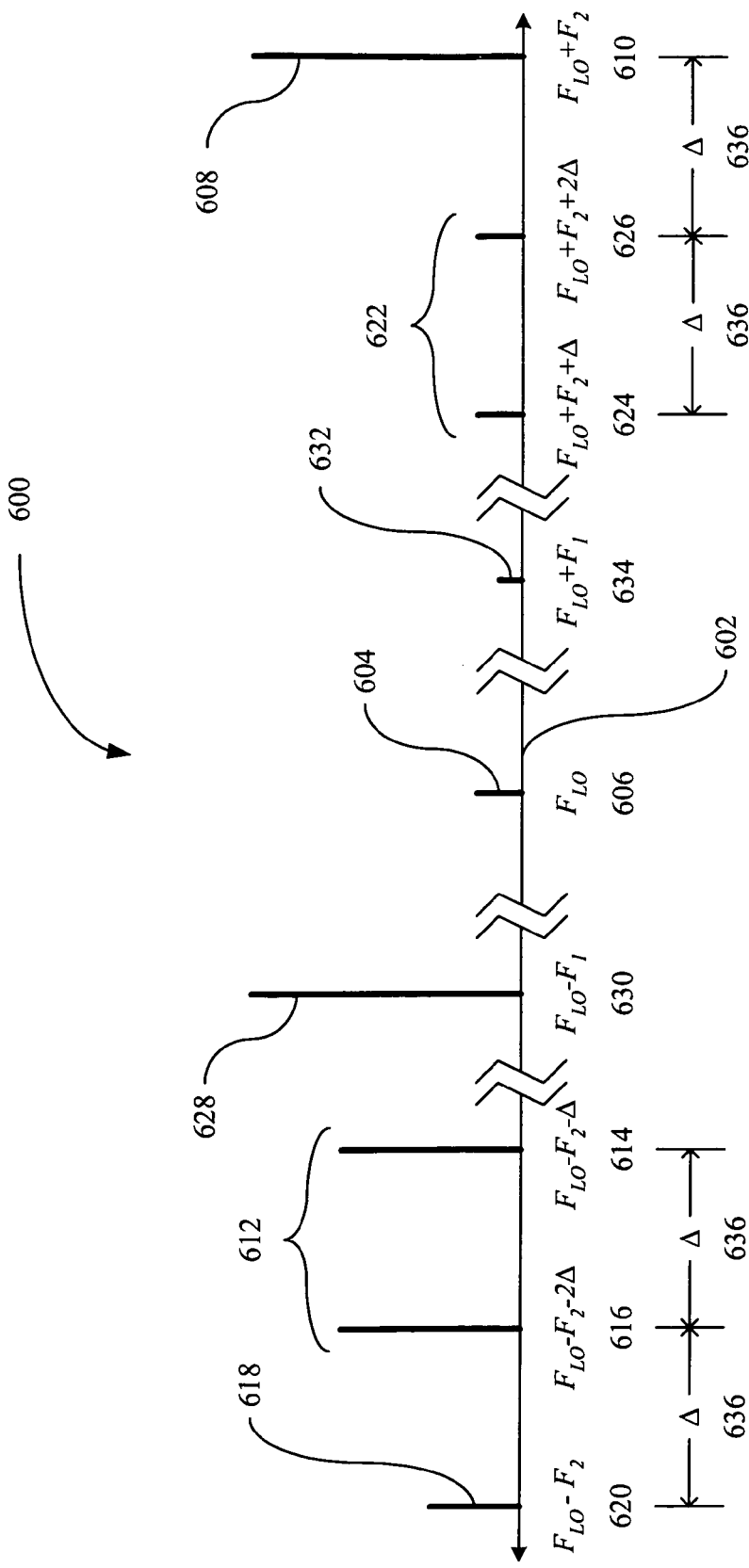
FIG. 6 shows a plot of an example stepped image calibration spectrum before detection versus frequency.

The VMCS utilizes knowledge of the calibration at lower IF frequencies to calibrate higher IF frequencies. The VMCS is capable of considering a multi-tone signal with two different IF frequencies, $F_1$ and $F_2$, as shown in FIG. 6. $F_1$ is closer to the LO frequency, and the VMCS assumes that it knows the proper correction factors to eliminate its image. $F_2$ is in the opposite sideband—if the VMCS knows the correction for LSB $F_1$, the VMCS will set $F_2$ as an USB signal. The frequency difference between $F_1$ and the image of $F_2$ is a multiple of $\Delta$ and is within the VMCS detection bandwidth.

In FIG. 6, a plot 600 of an example stepped image calibration spectrum before detection versus frequency 602 is shown. The plot 600 shows nine signals including a LO feed-through signal 604 at a frequency $F_{LO}$ 606, desired upper sideband signal 608 at a frequency $F_{LO}+F_2$ 610, test tones signals 612 at frequencies $F_{LO}-F_2-\Delta$ 614 and $F_{LO}-F_2-2\Delta$ 616, image signal 618 at frequency $F_{LO}-F_2$ 620, test tone images 622 at frequencies $F_{LO}+F_2+\Delta$ 624 and $F_{LO}+F_2+2\Delta$ 626, corrected lower sideband signal ("LSB") 628 at frequency $F_{LO}-F_1$ 630, and corrected image signal 632 at frequency $F_{LO}+F_1$ 634. In this example, the frequency difference between $F_1$ and the image of $F_2$ is a multiple of $\Delta$ and the frequency spacing 636 between signals is equal to $\Delta$.

In this example, the LSB signal 628 at frequency $F_{LO}-F_1$ 630 is corrected using known calibration at that IF frequency, so the corrected image 632 at frequency $F_{LO}+F_1$ 634 may be assumed to be negligible. As a result in this example, the only tone pair which produces a significant mixing product at $F_2-F_1$ is the known LSB signal 628 at frequency $F_{LO}-F_1$ 630 and the image signal 618 at frequency $F_{LO}-F_2$ 620.

Stepped Image Calibration: Gain Ratio and Quadrature Adjustment

Since the LSB signal 628 is known and correct, this allows the VMCS to use the detected measurement at $F_2-F_1$ to calibrate the quadrature and gain ratio errors to eliminate the image generated by the desired signal 608 at frequency $F_{LO}+F_2$ 610. As an example, this process includes:

1) Playing a multi-tone signal from the ARB 106 I/Q ports with the following characteristics:

| Frequency of Tone | Power level of Tone | Notes |
|---|---|---|
| $-F_1$ | $P_{High}$ | The tone at $-F_1$ has image correction applied |
| $F_2$ | $P_{High}$ | If $F_1$ is an LSB, $F_2$ is a USB, if $F_1$ is a USB, $F_2$ is an LSB |
| $-F_2 + \Delta$ | $P_{Low}$ | Assumes $F_2$ is a USB, if not use $F_2 - \Delta$ |
| $-F_2 + 2\Delta$ | $P_{Low}$ | Assumes $F_2$ is a USB, if not use $F_2 - 2\Delta$ |

2) Utilizing the triggered digitizer 128 and an FFT, measure the detected signal 232 from the digitizer 128 at frequencies of $F_2-F_1$, $F_2-F_1-\Delta$, and $F_2-F_1-2\Delta$. In this example, the signals at $F_2-F_1-\Delta$ and $F_2-F_1-2\Delta$ are the test tones $T_1$ and $T_2$ and the signal at $F_2-F_1$ is the signal of interest $S_3$. Corrections to the test tones may be applied as described above utilizing the relationships A=Phase ($T_1$), B=(Phase ($T_2$)−A) ($F_2-F_1$), and $e^{j(-A-B(F_3-F_1))}$.

3) Determining the measured quadrature and gain ratio by utilizing the following relationships:

$$\text{Phase\_quadrature}_{Measured} = -2(\text{imaginary part of the detected signal at frequency } F_2-F_1),$$

where there is a sign reversal if $F_1$ is a LSB; and $$\text{Gain\_ratio}_{Measured} = \frac{(1 - 2[\text{real part of detected signal at frequency } F_2 - F_1])}{\cos(\text{Phase\_quadrature}_{Measured})}$$

4) Utilizing the measured calibration coefficients to correct the waveform. Again, this step is repeated utilizing the best known corrections, and updating the corrections at each step with the newly measured coefficients. As an example, using the DC calibration results as a starting point would typically result in 50 dBc images, after which it typically takes approximately three (3) iterations to reach 80+ dBc. If the VMCS has an optional target calibration accuracy, the VMCS may utilize the amplitude of the measured signal at $2F_{IF}$ as a measure of the calibration accuracy, and stop the iterative process when the signals are sufficiently low as defined by the calibration accuracy.

This low-frequency calibration process gives the VMCS a good baseline calibration to start stepping in frequency. As an example, if the VMCS maximum acceptable detection frequency (given the power sensor 126 and digitizer 128) is $F_D$, the VMCS can go to an IF frequency of $F_D/2$ using the low-frequency calibration, then go to an IF frequency of $3F_D/2$ using one step of the image calibration. The VMCS may then use that information to take the next step to $5F_D/2$ then to $7F_D/2$, and continue stepping outwards until the VMCS has covered the IF bandwidth of interest.

Amplitude Flatness Calibration

Once the Image Calibration process is completed, the VMCS may calibrate out post-I/Q amplitude flatness. This may potentially include arbitrary linear networks located after the vector modulator.

Figure 7:
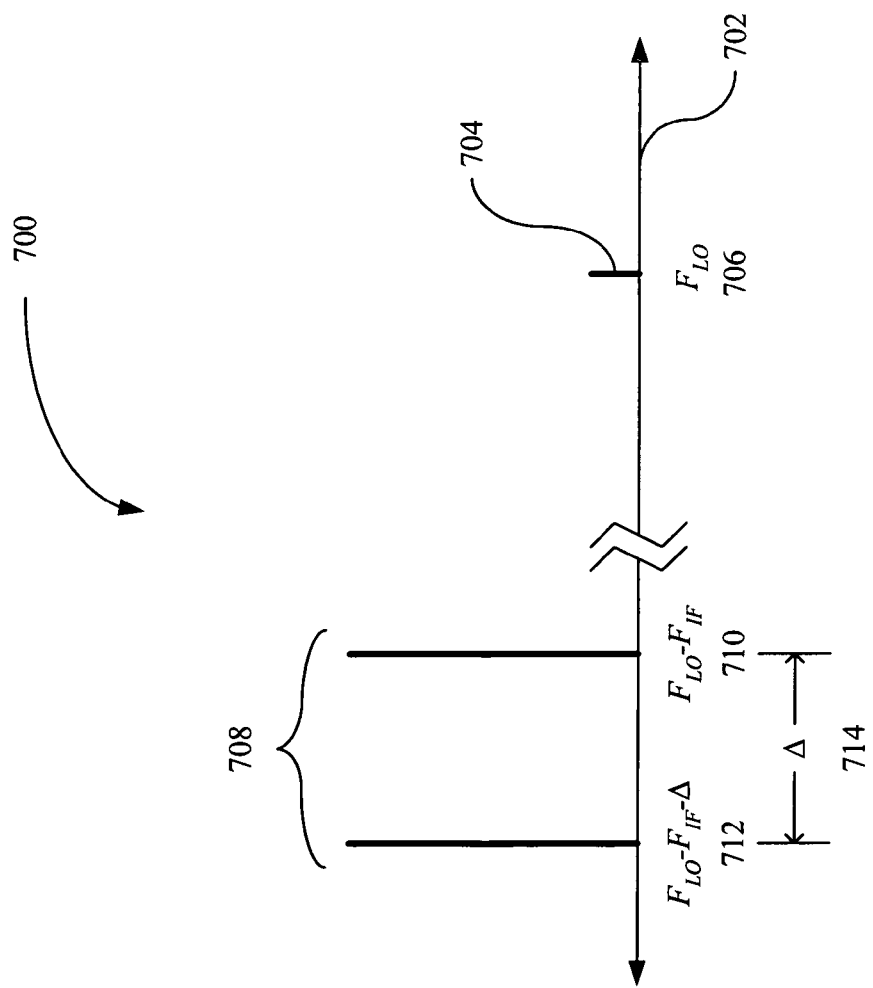
FIG. 7 shows a plot of an example amplitude flatness calibration spectrum before detection versus frequency.

In FIG. 7, a plot 700 of an example amplitude flatness calibration spectrum before detection versus frequency 702 is shown. The plot 700 shows three signals including a LO feed-through signal 704 at a frequency $F_{LO}$ 706 and test tones signals 708 at frequencies $F_{LO}-F_{IF}$ 710 and $F_{LO}-F_{IF}-\Delta$ 712 spaced 714 $\Delta$ apart.

At each IF frequency of interest, the VMCS plays a closely spaced pair of tones 708 which generate a detected signal at detection frequency $\Delta$. The amplitude of this detected signal is proportional to the square of the amplitude of the RF signal; the VMCS may therefore calculate the relative amplitude of RF signal pairs at different IF frequencies. As an example, because the VMCS has sufficient information to provide 70 dBc image rejection, errors in the detected signal due to the images mixing with each other will be approximately 140 dBc down and hence negligible.

Phase Calibration

Figure 8:
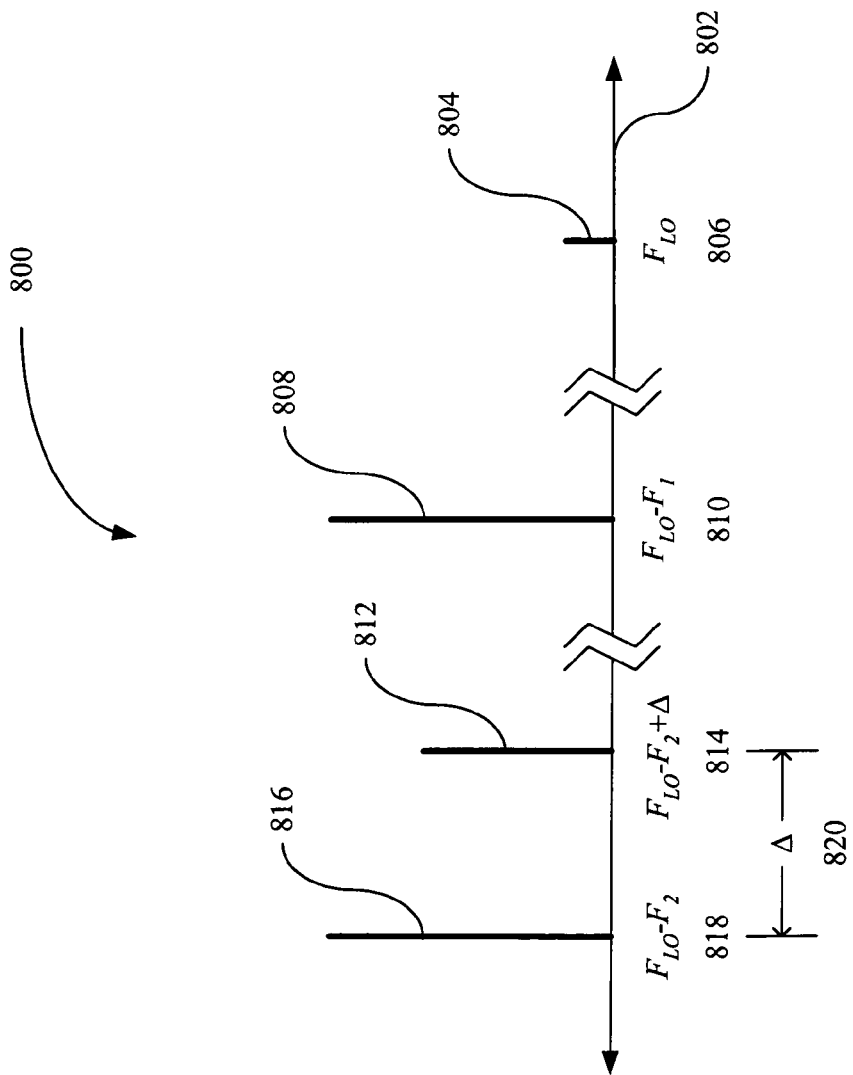
FIG. 8 shows a plot of an example phase flatness calibration spectrum before detection versus frequency.

In FIG. 8, a plot 800 of an example phase flatness calibration spectrum before detection versus frequency 802 is shown. The plot 800 shows four signals including a LO feed-through signal 804 at a frequency $F_{LO}$ 806, a desired signal 808 at frequency $F_{LO}-F_1$ 810, test tone signal 812 at frequency $F_{LO}-F_2+\Delta$ 814, and known signal 816 at frequency $F_{LO}-F_2$ 818 spaced 820 $\Delta$ apart.

Phase calibration is relative to some signal, and in this example the phase calibration is relative to the lowest (most negative) IF frequency of interest. For each step in the phase calibration process, the VMCS plays a tone whose phase is presumed to be known and a tone at some offset frequency less than the VMCS detection bandwidth. The mixing product of these two tones will generate a detected signal whose phase is capable of being measured. This measured phase may then be corrected.

Persons skilled in the art will understand and appreciate, that one or more processes, sub-processes, or process steps described may be performed by hardware or software, or both. Additionally, the invention may be implemented completely in software that would be executed within a microprocessor, general-purpose processor, combination of processors, DSP, or ASIC. The invention may be realized in a centralized fashion in at least one computer system, or in a distributed fashion where different elements are spread across several interconnected computer systems. If the process is performed by software, the software may reside in software memory in the controller 108. The software in software memory may include an ordered listing of executable instructions for implementing logical functions (i.e., "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium", "computer-readable medium" or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

While the present invention has been described with reference to certain embodiments, it will be understood by those skilled in the art that various changes can be made and equivalents can be substituted without departing from the scope of the present invention. It will be understood that the foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed:

1. A system for obtaining a calibrated modulated output signal while minimizing spurious output signals from a vector modulator, the system comprising:
   a signal generator that generates a first output signal having a plurality of frequency including a modulation component at a desired modulation frequency and first and second test tone components at first and second frequencies, said first frequency being separated by a first predetermined difference from a carrier frequency of a local oscillator providing the signal at said carrier frequency to be modulated by said vector modulator, and said second frequency being separated by a second predetermined difference from said carrier frequency, the second predetermined difference being different in magnitude from said first predetermined difference, and the power levels of said first and second test tone components being lower than the power level of said modulation component at said desired modulation frequency;
   a detector that receives a sampled signal from the output of said vector modulator when said vector modulator receives said first output signal from said signal generator, said detector measuring power in a plurality of predetermined frequency components of said sampled signal from said output of said vector modulator to provide a corresponding plurality of measured power levels at frequencies determined by said frequency components of said first output signal, said frequencies including at least one frequency that is determined by at least one of said first and second test tone components and is not equal to the either of said first or second predetermined differences; and
   a controller in communication with said signal generator and said detector, said controller altering said first output signal from said signal generator such that said measured power levels for said predetermined frequency components conform to predetermined values.

2. The system as described in claim 1, wherein said detector comprises:
   a power sensor in signal communication with said vector modulator; and
   a digitizer in signal communication with said power sensor.

3. The system of claim 2, further including:
   a vector modulator output filter module in signal communication with said vector modulator;
   a coupler in signal communication with said power sensor and said vector modulator output filter module;
   a preamplifier in signal communication with said power sensor; and
   a preamplifier filter in signal communication with said digitizer and said preamplifier.

4. The system of claim 3, wherein
   said vector modulator output filter module includes a low-pass filter and a high-pass filter; and
   said preamplifier is an alternating current ("AC") coupled preamplifier with low noise figure.

5. A method for obtaining a calibrated modulated output signal while minimizing spurious output signals from a vector modulator, the method comprising:
   generating a first output signal having a plurality of frequency components including a desired modulation component and first and second test tone components at first and second frequencies, said first frequency being separated by a first predetermined difference from a carrier frequency of a local oscillator providing the signal at said carrier frequency to be modulated by said vector modulator, and said second frequency being separated by a second predetermined difference from said carrier frequency, wherein the power levels of said first and second test tone components are lower than the power level of said desired modulation component;

measuring power in a plurality of predetermined frequency components of a sampled signal from an output of said vector modulator to provide a corresponding plurality of measured power levels at frequencies determined by said frequency components of said first output signal when said vector modulator receives said first output signal, said frequencies including at least one frequency that is determined by at least one of said first and second test tone components and is not equal to the either of said first or second predetermined differences;

altering said first output signal such that said measured power levels for said predetermined frequency components in the correspondingly altered output from said vector modulator conform to predetermined values; and providing said altered output signal from said vector modulator as said calibrated modulated output signal.

6. The method of claim 5, wherein providing said calibrated signal includes:
calibrating the local oscillator ("LO") feed-through from the sampled signal;
calibrating images versus frequency of the vector modulator; and
calibrating an amplitude and phase across a full modulation bandwidth of the vector modulator.

7. The method of claim 6, wherein calibrating the LO feed-through includes:
calibrating a direct current ("DC") feed-through; and
calibrating a low-frequency feed-through.

8. The method of claim 7, wherein calibrating a DC feed-through includes:
playing a multi-tone signal that is input into the vector modulator; and
measuring an LO feed-through and image signal relative to the multi-tone signal.

9. The method of claim 8, wherein measuring the LO feed-through and image signal includes:
determining a direct current ("DC") offset of the digitized power signal; and determining a DC quadrature phase error and gain error in the vector modulator.

10. The method of claim 9, wherein the multi-tone signal is a single sideband modulation ("SSB") multi-tone signal having three tones that include:
a desired upper sideband signal at a first frequency equal to a LO frequency plus 3 times a minimum resolvable detection frequency ("$\Delta$"); and
two test tones at second and third frequencies equal to the LO frequency minus $\Delta$ and the LO frequency minus two times $\Delta$, respectively,
wherein $\Delta$ is equal to sixteen (16) times a frequency of a digitizer utilized to produce the digitized power level signal divided by a length of a predetermined Fast Fourier Transform ("FFT").

11. The method of claim 10, wherein determining a DC quadrature phase error and gain error in the vector modulator includes:
applying an FFT with the predetermined FFT length to the digitized power level signal,
detecting signal tones at 3, 4, 5 and 6 times $\Delta$ frequency offsets, and
calibrate an amplitude and phase uncertainty utilizing the $4\Delta$ and $5\Delta$ signal tones.

12. The method of claim 11, wherein calibrating an amplitude and phase uncertainty includes:
determining a first phase correction equal to the phase of the $4\Delta$ tone;
determining a second phase correction equal to the multiplication of phase of the $5\Delta$ tone minus the first phase correction multiplied by the difference between the frequency of the $5\Delta$ tone and the $4\Delta$ tone; and
determining a corrected phase of the desired signal by multiplying the desired signal by an exponential of the imaginary part of the difference of the negative of the first phase correction minus the second phase correction multiplied by the difference between the frequency of the 5A tone and the 4A tone.

13. The method of claim 12, wherein determining the DC offset includes:
determining a measured imaginary offset (I_offset$_{measured}$); and
determining a measured quadrature offset (Q_offset$_{Measured}$), where
I_offset$_{Measured}$=real part of detected signal at frequency $3\Delta$; and $$Q\_offset_{measured} = \frac{\text{imaginary part of detected signal at } 3\Delta}{\text{Gain\_ratio}_{measured} - \text{I\_offset}_{measured}\sin(\text{Phase\_quadrature}_{measured})},$$

and
where
Phase_quadrature$_{Measured}$=−2(imaginary part of the detected signal at frequency $6\Delta$) and
Gain_ratio$_{Measured}$=(1−2[real part of detected signal at frequency 6AD])/ cos(Phase_quadrature$_{Measured}$).

14. The method of claim 9, wherein calibrating images versus frequency of the vector modulator includes calibrating images versus the intermediate frequency ("IF").

15. The method of claim 14, wherein calibrating an amplitude and phase across the full modulation bandwidth of the vector modulator includes:
calibrating a linear amplitude flatness versus IF frequency; and
calibrating a linear phase versus IF frequency.

16. The method of claim 9, further including:
applying a Fourier transform of the digitized power level signal;
multiplying the imaginary part of the digitized power level signal by the quadrature error and gain ratio at each frequency produced by the Fourier transform to produced a complex signal for the quadrature ("Q") channel;
subtracting the imaginary part of the Q channel from the in-phase ("I") channel;
multiplying the resultant signal (I+jQ) by the linear amplitude and phase correction;
applying an inverse Fourier transform to the resultant signal;
playing a tone on the I channel that is equal to the real part of the inverse Fourier transform to the resultant signal; and
playing a second tone on the Q channel that is equal to the imaginary part of the inverse Fourier transform to the resultant signal plus the Q-channel offset.

17. A system for obtaining a calibrated modulated output signal while minimizing spurious output signals from a vector modulator, the system comprising:

means for generating a first output signal having a plurality of frequency components including first and second test tone components at first and second frequencies, said first frequency being separated by a first predetermined difference from a carrier frequency of a local oscillator providing the signal at said carrier frequency to be modulated by said vector modulator, and said second frequency being separated by a second predetermined difference from said carrier frequency, wherein the power levels of said first and second test tone components are lower than the power level of said desired modulation component;

means for receiving a sampled signal from the output of said vector modulator when said vector modulator receives said first output signal from said generating means;

means for measuring power in a plurality of predetermined frequency components of said received sampled signal to provide a corresponding plurality of measured power levels at frequencies determined by said frequency components of said first output signal, said frequencies including at least one frequency that is determined by at least one of said first and second test tone components and is not equal to the either of said first or second predetermined differences; and means for controlling said generation of said first output signal such that said measured power levels for said predetermined frequency components conform to predetermined values to produce said calibrated modulated output signal.

18. The system of claim 17, wherein said means for controlling includes:

means for calibrating the local oscillator ("LO") feed-through from the sampled signal;

means for calibrating images versus frequency of the vector modulator; and means for calibrating an amplitude and phase across a full modulation bandwidth of the vector modulator.

19. The system of claim 18, wherein said means for calibrating the LO feed-through includes:

means for calibrating a direct current ("DC") feed-through; and means for calibrating a low-frequency feed-through, and wherein said means for calibrating images versus frequency of the vector modulator includes means for calibrating images versus the intermediate frequency ("IF"); and wherein means for calibrating an amplitude and phase across the full modulation bandwidth of the vector modulator includes:

means for calibrating a linear amplitude flatness versus IF frequency; and means for calibrating a linear phase versus IF frequency.

* * * * *

UNITED STATES PATENT AND TRADEMARK OFFICE
CERTIFICATE OF CORRECTION

| | | |
|---|---|---|
| PATENT NO. | : 8,224,269 B2 | Page 1 of 1 |
| APPLICATION NO. | : 11/581876 | |
| DATED | : July 17, 2012 | |
| INVENTOR(S) | : Roger L. Jungerman et al. | |

It is certified that error appears in the above-identified patent and that said Letters Patent is hereby corrected as shown below:

In column 18, line 24, In Claim 13, delete "$I\_offset_{Measured} = \text{real part of detected signal at frequency } 3\Delta;$ and" and insert -- $I\_offset_{Measured} = \text{real part of detected signal at frequency } 3\Delta;$ and --, therefor.

Signed and Sealed this
Eighteenth Day of September, 2012

David J. Kappos
*Director of the United States Patent and Trademark Office*